United States Patent [11] 3,558,016

| [72] | Inventor | Ludwig Beinhofer |
| | | Rugierstr. 11, Nuremberg, Germany |
| [21] | Appl. No. | 801,999 |
| [22] | Filed | Feb. 25, 1969 |
| [45] | Patented | Jan. 26, 1971 |

[54] AUTOMATIC DOUGH DISPENSING APPARATUS
9 Claims, 5 Drawing Figs.

[52] U.S. Cl. ............................................. 222/218, 222/254
[51] Int. Cl. ................................................ G01f 11/06
[50] Field of Search ........................................ 222/217, 218, 254, 281

[56] References Cited
UNITED STATES PATENTS
| 709,793 | 9/1902 | McGinnity | 222/218 |
| 1,560,313 | 11/1925 | Pittman | 222/281 |

FOREIGN PATENTS
| 421,532 | 12/1910 | France | 222/218 |

Primary Examiner—Stanley H. Tollberg
Assistant Examiner—Frederick R. Handren
Attorney—Richards and Geier ABSTRACT: A dough dispensing apparatus in which the dough is fed intermittently downwardly by a feeding mechanism into the open ends of a plurality of cylinders which extend radially in an intermittently rotating horizontal drum and in each of which a cam-controlled plunger is slidable which in its retracted position determines the exact amount of dough which this cylinder may receive from the feeding mechanism when temporarily stopped underneath the discharge opening of the feeding mechanism, and which, when the drum is further rotated, ejects the dough from the respective radial cylinder.

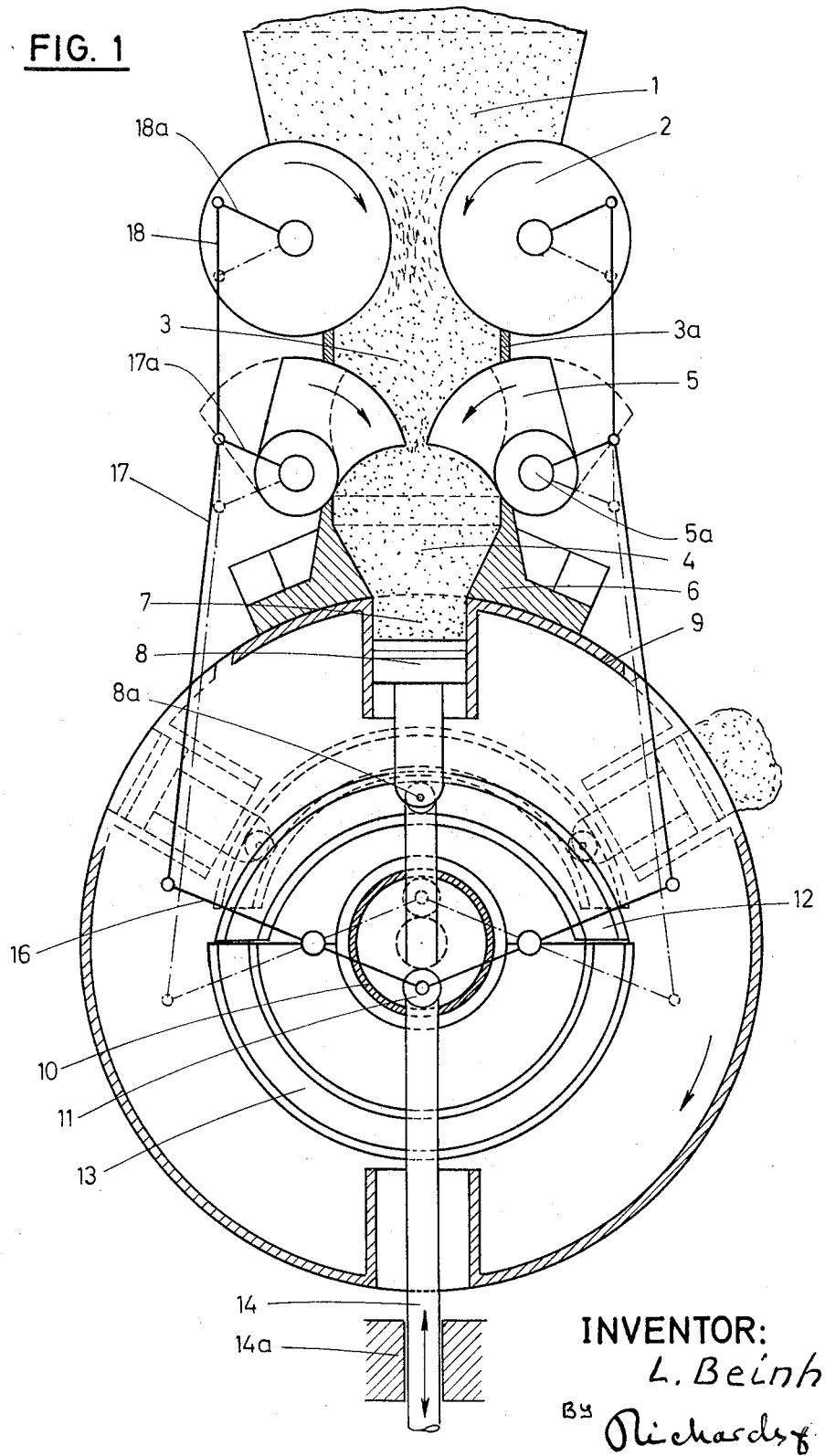

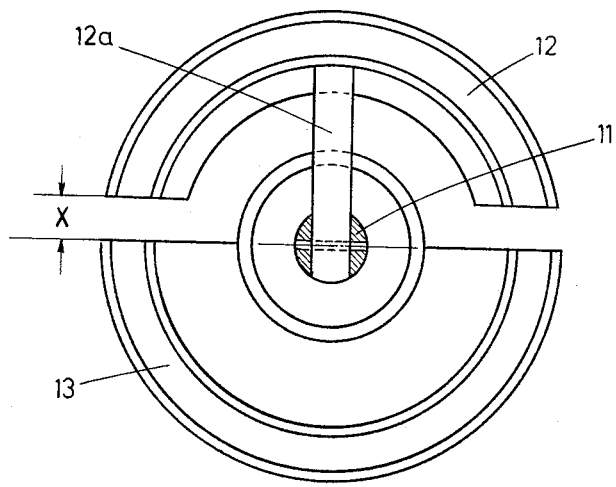
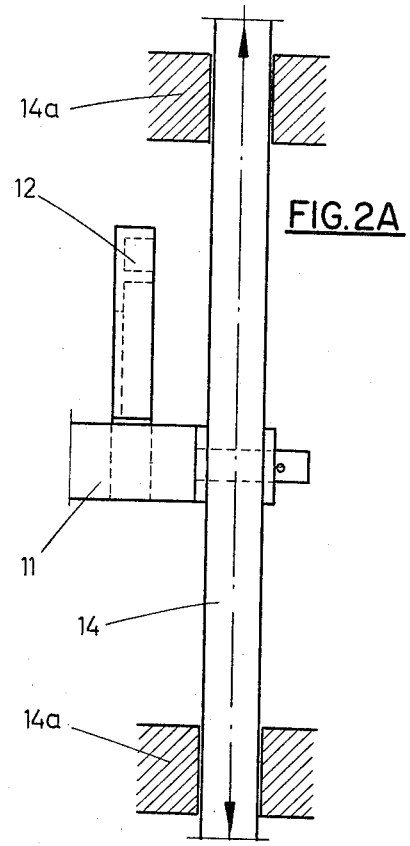
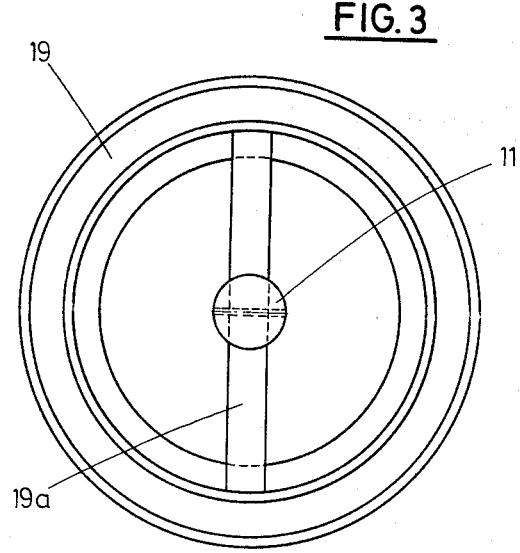
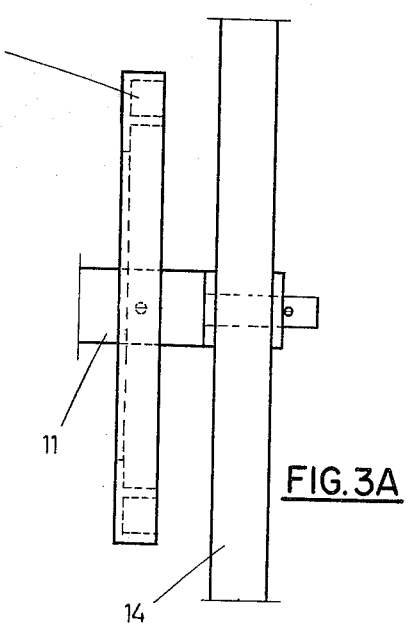

AUTOMATIC DOUGH DISPENSING APPARATUS

The present invention relates to an apparatus for automatically and consecutively dispensing equal amounts of a doughy material.

This apparatus comprises a dough feeding mechanism and directly underneath the same a dough dispensing mechanism. As seen in a vertically downward order of succession and in a symmetrical arrangement relative to the vertical central plane of the apparatus, the elements of the dough feeding mechanism consist according to the invention of a filling funnel, a pair of opposite dough feeding rollers which are driven in opposite directions to each other, a dough receiving chamber which is located directly underneath these feed rollers, a pair of opposite dough extruding elements which are likewise driven in opposite directions to each other and are pivotable within the sidewalls of the dough chamber back and forth toward the inside and outside of this chamber, and a discharge or extrusion element which forms the lower end of the dough chamber and is provided with one or more nozzlelike extrusion openings. The elements of the dough dispensing mechanism which are disposed directly underneath those of the dough feeding mechanism and are likewise arranged symmetrically to the central vertical plane of the apparatus consist of a cylindrical drum which is rotatable intermittently in one direction about the axis of a horizontal tubular shaft and is provided with a plurality of smaller cylindrical dough chambers which extend in radial directions of the drum to the peripheral surface thereof and are spaced at equal peripheral distances from each other. During the intermittent rotation of the drum, the open outer end of each of these radial dough chambers is placed underneath one of the extrusion openings so as to receive a certain quantity of dough or similar material which is determined by a measuring plunger which is slidable back and forth in the respective radial dough chamber and the movements of which are controlled by a cam track. The invention further provides that the motions of the movable elements of the dough feeding mechanism, i.e. the feed rollers and extruding elements, are positively controlled by connecting means between these elements and the elements which effect the reciprocating strokes of the plungers of the dough dispensing mechanism.

The apparatus according to the invention has the advantage that the dough or similar material is fed directly in a vertical downward direction from the filling funnel between the two-feed rollers and under the conveying pressure of these rollers into the dough chamber and from the latter by means of the two pivotable extrusion elements into the radial chambers of the drum in which identical amounts of dough of the same weight are deposited uniformly and homogeneously without gaps when the plungers are in their retracted position in these chambers and from which this dough is thereafter ejected by the respective plunger during the outward stroke of the latter.

Another feature of the invention consists in the provision of suitable means for adjusting the length of the reciprocating strokes of the plungers in the radial dough chambers of the rotatable drum so that all of the pieces of dough of one series which are ejected from these chambers will have the same volume and weight in accordance with the particular adjustment of the plunger strokes.

As already indicated above, it is another feature of the invention that the uniform division and dispensation of the dough or similar material is attained by means of a cylindrical drum which is rotatable about the horizontal axis of a tubular shaft and is provided with a plurality of radial chambers forming dough-receiving cylinders in which measuring plungers are slidable which determine accurately the amount of dough which is to be deposited in each radial chamber and the strokes of which are controlled by cam tracks which may be adjustable, for example by being exchangeable for those of other dimensions. Of all of the features of the invention it is, however, probably the most important that the movable elements of the dough feeding mechanism are driven in accordance with the strokes of the plungers in the cylindrical drum by being positively connected by suitable means of a conventional type to the driving means of these plungers.

According to one preferred embodiment of the invention, the infinitely variable control of the movements of the measuring plungers in the radial chambers of the rotatable drum may be attained by providing a circular cam track which is divided into an upper and a lower section and by moving the upper section up and down by securing it to a transverse shaft which is located at the inside of the horizontal tubular shaft and is moved vertically up and down within the latter by means of drive rods which are connected to the ends of this inner shaft. The cam track, the lower section of which is rigidly secured to the tubular shaft, is preferably of a U-shaped cross section, and the radially inner ends of the measuring plungers preferably carry rollers which engage into and are slidable relative to this cam track during the rotation of the drum.

According to another embodiment of the invention, the circular cam track may also be undivided and movable upwardly and downwardly by vertically reciprocating drive rods.

The features and advantages of the present invention will become further apparent from the following detailed description thereof which is to be read with reference to the accompanying drawings, in which:

FIG. 1 shows a diagrammatic cross section of the dough feeding mechanism and the dough dividing and dispensing mechanism;

FIG. 2 shows a front view of a cam track which is divided into two sections and of the means for reciprocating the upper section; while FIG. 2a is essentially a side view of the structure shown in FIG. 2;

FIG. 3 shows a front view of a closed circular cam track together with the means for reciprocating the same, while FIG. 3a is essentially a side view of the structure shown in FIG. 3.

As illustrated in FIG. 1 of the drawings, the apparatus according to the invention essentially comprises an upper dough feeding mechanism consisting of a funnel-shaped upper end 1, a pair of opposite dough feeding rollers 2 which are mounted symmetrically to the vertical central plane of the apparatus and are rotatable in opposite direction to each other, a dough collecting chamber 3 directly underneath the feed rollers 2 which is limited at both sides by short sidewalls 3a which also form lateral wiping elements, and underneath the latter a pair of dough extruding elements 5 which are likewise mounted symmetrically to the vertical central plane of the apparatus and are rotatable simultaneously in opposite directions to each other about their axes 5a by reciprocating laterally into and out of the dough chamber 3 within the lateral walls thereof.

The lower end of the dough chamber 3 is formed by a dough extrusion nozzle 6 which is likewise disposed symmetrically to the central vertical plane of the apparatus and is provided with discharge openings 4. The two upper lateral edges of the extrusion nozzle 6 form wiping blades along which the hubs of the extruding elements 5 are slidable and which also close the dough chamber 3 in lateral directions.

The front and rear sides of the dough feeding mechanism are closed by a pair of removable bearing covers, not shown, which are provided with the bearings for the shafts of the feed rollers 2 and the extruding elements 5 and also support the extrusion nozzle 6.

The dough dispensing mechanism is likewise disposed symmetrically to the central vertical plane of the apparatus and underneath the dough feeding mechanism. It consists of a tubular shaft 10 which is mounted in a fixed horizontal position in the machine frame, a cylindrical drum 9 which is rotatable in one direction around the axis of this shaft 10 and provided with any desired number of radially extending cylindrical chambers 7 which are equally spaced peripherally from each other and may form one group or several groups of such radial chambers in rows behind each other, and a measuring plunger 8 which is adapted to reciprocate longitudinally in each chamber 7 so as to be in its retracted position when the respective chamber 7 is disposed underneath the associated discharge opening 4 and in the outward position when the respective chamber 7 reaches the ejecting area. On their radially inner ends, each measuring plunger 8 is provided with a guide roller 8a which is guided within a cam track forming a circular element which, according to the embodiment of the invention as shown in FIG. 2, is divided into two sections, namely, an upper section 12 and a lower section 13. The upper section 12 of the cam track is movable back and forth in a vertical direction by being secured to the outer end of a supporting rod 12a the inner end of which is secured to the transverse shaft 11 which is likewise movable back and forth in a vertical direction, while the lower section 13 of the cam track is rigidly connected to the tubular shaft 10.

As illustrated in FIG. 3, the cam track may, however, also be provided in the form of a closed circular element 19 which is secured by its supporting rod 19a to the vertically movable transverse shaft 11. The two ends of this shaft 11 are mounted on guide rods 14 which are movable up and down in a vertical direction in bearings 14a on the machine frame.

The vertical movements of the two guide rods 14 according to FIGS. 2 and 3 may be effected and controlled by any suitable means of a conventional type.

By the provision of pivotable connecting means 16, 17, 17a, 18, and 18a, the vertical movements of guide rods 14 are transmitted to the dough feeding mechanism so as to effect positive movements of its elements as previously described in accordance with the reciprocating strokes of the plungers 8. Of course, the positive connection between these elements and movements as indicated in FIG. 1 may also be effected by any conventional means other than mechanical means.

Although my invention has been illustrated and described with reference to the preferred embodiments thereof, I wish to have it understood that it is in no way limited to the details of such embodiments but is capable of numerous modifications within the scope of the appended claims.

I claim:

1. An automatic apparatus for dispensing a doughy material comprising a dough feeding mechanism and vertically underneath the same a dough dispensing mechanism, the elements of both mechanisms being disposed symmetrically to the central vertical plane of the apparatus, said dough feeding mechanism comprising a filling funnel, a dough chamber connected to the lower end of said funnel, and at least one pair of feed rollers rotatable in opposite directions to each other and projecting from the opposite sides into said chamber for feeding the dough downwardly into and through said chamber, and a dough extruding nozzle at the lower end of said chamber and having an outlet opening at its lower end, said dough dispensing mechanism comprising a horizontally extending shaft, a cylindrical drum intermittently rotatable in one direction about the axis of said shaft and having a peripheral surface in sliding engagement with the lower end of said extruding nozzle, a plurality of cylinders extending in radial directions of said drum at the inside thereof and spaced at equal peripheral distances from each other and having open ends in the peripheral surface of said drum adapted to be placed successively in vertical alignment with said outlet opening, a plunger slidable back and forth in each of said cylinders and when retracted determining the amount of doughy material to be deposited in said cylinder from said outlet opening, said plunger when moved outwardly during the further rotation of said drum being adapted to eject said doughy material from each of said cylinders, cam means for controlling the reciprocating movements of said plungers, driving means for lifting and lowering at least a part of said cam means during the rotation of said drum, and means connecting said driving means to said feed rollers for driving the same simultaneously with the movements of said plungers.

2. A dispensing apparatus as defined in claim 1, in which said dough chamber has opposite lateral walls underneath the peripheral surfaces of said feed rollers, the upper ends of said walls substantially engaging with and adapted to wipe said peripheral surfaces during the rotary movements thereof.

3. A dispensing apparatus as defined in claim 2, further comprising a pair of rotatable dough extruding elements disposed between said feed rollers and said extruding nozzle and pivotable about horizontal axes disposed at substantially the same level and adapted to pivot through said opposite sides of said chamber in opposite directions to each other toward the inside and outside of said chamber, said connecting means also connecting said driving means to said extruding elements for reciprocating the same simultaneously with the movements of said plungers and feed rollers.

4. A dispensing apparatus as defined in claim 3, in which the lower ends of said walls substantially engage with and are adapted to wipe the peripheral surfaces of said extruding elements during the rotary movements thereof.

5. A dispensing apparatus as defined in claim 1, in which said shaft is tubular and secured to said cam means, said driving means comprising a second shaft extending longitudinally through and projecting at both ends from said tubular shaft, a pair of drive rods connected to said ends of said second shaft for lifting and lowering the same within said tubular shaft and for thus also lifting and lowering said cam means during the rotation of said drum, said connecting means comprising connecting rods also connected to said ends of said second shaft.

6. A dispensing apparatus as defined in claim 4, in which each of said extruding elements has a hub, the upper ends of said extruding nozzle substantially engaging with said hubs and adapted to wipe the same during the rotary movements of said extruding elements.

7. A dispensing apparatus as defined in claim 1, in which said cam means comprise a circular element having a circular groove forming a cam track in one side thereof and coaxial therewith, and a roller on the radially inner end of each of said plungers and projecting into and slidable relative to said cam track during the rotation of said drum.

8. A dispensing apparatus as defined in claim 7, in which said circular element is divided into two separate sectors forming an upper sector and a lower sector, said lower sector being secured to said shaft and said upper sector being connected to said driving means and adapted to be lifted and lowered thereby during the rotation of said drum.

9. A dispensing apparatus as defined in claim 1, further comprising means for adjusting the length of the strokes of said driving means.